United States Patent
Seo et al.

(10) Patent No.: US 8,665,761 B2
(45) Date of Patent: Mar. 4, 2014

(54) METHOD AND APPARATUS FOR RELAYING DATA IN WIRELESS COMMUNICATION SYSTEM

(75) Inventors: Han Byul Seo, Anyang-si (KR); Young Seob Choi, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 13/148,883

(22) PCT Filed: Feb. 4, 2010

(86) PCT No.: PCT/KR2010/000683
§ 371 (c)(1),
(2), (4) Date: Aug. 10, 2011

(87) PCT Pub. No.: WO2010/093143
PCT Pub. Date: Aug. 19, 2010

(65) Prior Publication Data
US 2011/0310778 A1 Dec. 22, 2011

Related U.S. Application Data

(60) Provisional application No. 61/151,810, filed on Feb. 11, 2009, provisional application No. 61/152,951, filed on Feb. 16, 2009, provisional application No. 61/170,077, filed on Apr. 16, 2009.

(30) Foreign Application Priority Data

Jun. 1, 2009 (KR) .................. 10-2009-0047929

(51) Int. Cl.
*H04J 3/00* (2006.01)
*H04J 3/08* (2006.01)

(52) U.S. Cl.
USPC .......................................... 370/280; 370/315

(58) Field of Classification Search
USPC ................. 370/274, 279, 315, 316, 319, 321
See application file for complete search history.

(56) References Cited

U.S. PATENT DOCUMENTS 7,953,050 B2 * 5/2011 Li et al. ......................... 370/336
8,537,724 B2 * 9/2013 Love et al. .................... 370/280
(Continued)

FOREIGN PATENT DOCUMENTS

WO  WO 2007/069848 A2  6/2007

OTHER PUBLICATIONS

3GPP TSG-RAN WG1 #55, R1-084357, "Efficient support of relays through MBSFN subframes", Ericsson, Nov. 10-14, 2008; (3 pages).

(Continued)

*Primary Examiner* — Warner Wong
(74) *Attorney, Agent, or Firm* — Birch, Stewart, Kolasch & Birch, LLP

(57) ABSTRACT

A method of relaying data in a wireless communication system is provided. The method comprises: receiving data, transmitted over a first subframe from a base station, over a second subframe; and relaying the data to a user equipment over a third subframe which is placed after one or more subframes from the second subframe, wherein at least any one of the first and the second subframes is a non-detection subframe to which the user equipment does not attempt data detection. According to the present invention, the wireless communication system enables efficient data transmission between a base station and a relay station as compared to conventional subframe-configurated systems. Furthermore, the wireless communication system enables data transmission with improved wireless resource allocation efficiency.

6 Claims, 24 Drawing Sheets

(56) References Cited

U.S. PATENT DOCUMENTS

| | | | |
|---|---|---|---|
| 2009/0252077 A1* | 10/2009 | Khandekar et al. | 370/312 |
| 2009/0268658 A1* | 10/2009 | Chang et al. | 370/315 |
| 2010/0008282 A1* | 1/2010 | Bhattad et al. | 370/312 |
| 2010/0265870 A1* | 10/2010 | Cai et al. | 370/312 |
| 2010/0303013 A1* | 12/2010 | Khandekar et al. | 370/328 |
| 2011/0222411 A1* | 9/2011 | Koskinen et al. | 370/241 |
| 2012/0269113 A1* | 10/2012 | Park et al. | 370/315 |

OTHER PUBLICATIONS

3GPP TSG-RAN WG1 #55, R1-084446, "Decode and Forward Relays for E-UTRA enhancements", Texas Instruments, Nov. 10-14, 2008; pp. 1-5.

* cited by examiner

FIG. 22
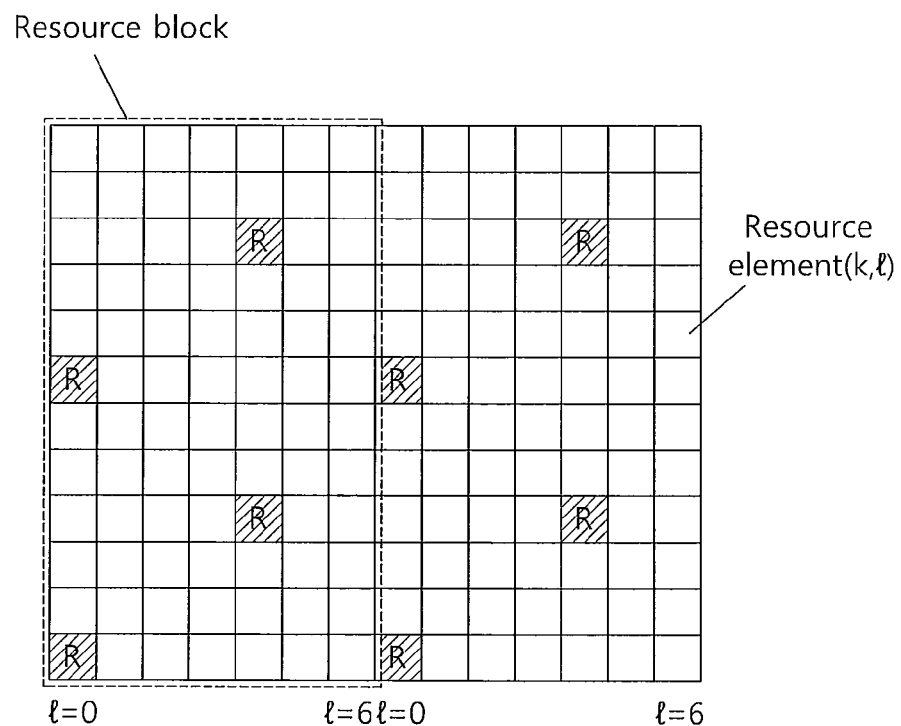
R: Rreference symbol
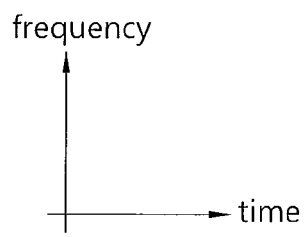

FIG. 23
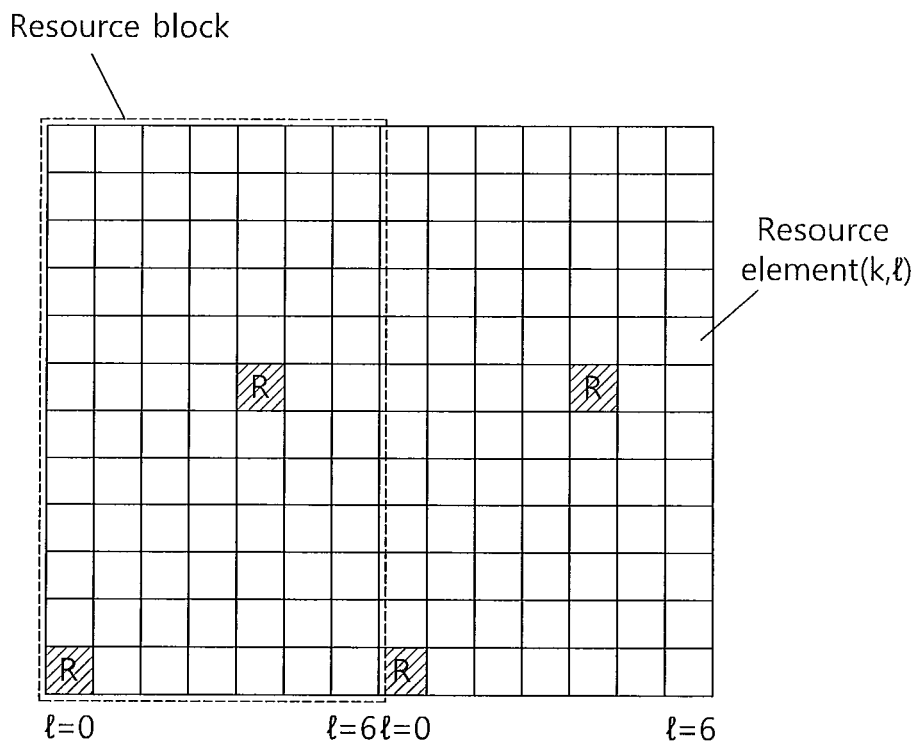
R: Rreference symbol
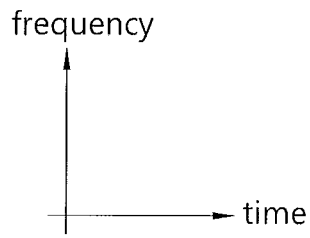

METHOD AND APPARATUS FOR RELAYING DATA IN WIRELESS COMMUNICATION SYSTEM

CROSS REFERENCE TO RELATED APPLICATIONS

This application is the National Phase of PCT/KR2010/000683 filed on Feb. 4, 2010, which claims the benefit under 35 U.S.C. 119(e) of U.S. Provisional Application Nos. 61/151,810, 61/152,951 and 61/170,077 filed on Feb. 11, 2009, Feb. 16, 2009 and Apr. 16, 2009, respectively, and under 35 U.S.C. 119(a) to Patent Application No. KR 10-2009-0047929 filed in Republic of Korea on Jun. 1, 2009, all of which are hereby expressly incorporated by reference into the present application.

TECHNICAL FIELD

The present invention relates to wireless communication, and more particularly, to a method and apparatus in which a relay station relays data in a wireless communication system.

BACKGROUND ART

In ITU-R (International Telecommunication Union Radio communication sector), a standardization task for IMT (International Mobile Telecommunication)-Advanced (i.e., the next-generation mobile communication system after the third generation) is being in progress. IMT-Advanced sets its goal to support IP (Internet Protocol)-based multimedia service at the data transfer rate of 1 Gbps in the stop and slow-speed moving states and at the data transfer rate of 100 Mbps in the fast-speed moving state.

3GPP ($3^{rd}$ Generation Partnership Project) is a system standard to satisfy the requirements of IMT-Advanced, and it is preparing LTE-Advanced improved from LTE (Long Term Evolution) based on an OFDMA (Orthogonal Frequency Division Multiple Access)/SC-FDMA (Single Carrier-Frequency Division Multiple Access) transmission scheme. LTE-Advanced is one of the strong candidates for IMT-Advanced. Relay station technology is included in the major technology of LTE-Advance.

A relay station is an apparatus for relaying signals between a base station and a user equipment and is used to extend the cell coverage of a wireless communication system and improve the throughput.

The relay station is difficult to transmit and receive signals through transmission antennas and reception antennas using the same frequency band on the same time. In general, because power of a transmission signal transmitted by a relay station is much greater than power of a reception signal received by the relay station, the transmission signal of the relay station functions as interference for the reception signal and the reception signal may be distorted. This is called self-interference (SI). In order for the relay station to solve the self-interference problem, a complicated interference removal process is required, and transmission and reception signal processors need to be spatially separated from each other. It is practically very difficult for the relay station to remove self-interference. Although self-interference is removed, a lot of the costs will be consumed. It is therefore assumed that it is difficult for a relay station to transmit and receive signals using the same frequency band on the same time.

A relay station is difficult to perform data reception from a base station and data transmission to a user equipment (or data transmission to a base station and data reception from a user equipment) at the same time because of the self-interference problem. Cases where a relay operation is not guaranteed in the configuration of a specific radio frame may be generated.

In the prior art, in the case where a relay station transmits data to a base station in a certain subframe, the base station sets the relevant subframe as an uplink subframe, and the relay station sets the relevant subframe as an uplink subframe or an MBSFN (Multicast/Broadcast Single Frequency Network) subframe and then transmits the data. In accordance with this conventional method, for example, a radio frame configuration including only one uplink subframe within a radio frame, when a relay station transmits data to a base station using the uplink subframe, the relay station cannot receive data from a user equipment in the relevant uplink subframe. Consequently, in this radio frame configuration, the relay operation of the relay station is not guaranteed.

There is a need for a method of a relay station efficiently relaying data in a wireless communication system.

DISCLOSURE

Technical Problem

It is an object of the present invention to provide a method and apparatus for relaying data in a wireless communication system.

Technical Solution

In an aspect, a method of relaying data in a wireless communication system is provided. The method comprising: receiving data, transmitted over a first subframe from a base station, over a second subframe; and relaying the data to a user equipment over a third subframe which is placed after one or more subframes from the second subframe, wherein at least any one of the first and the second subframes is a non-detection subframe to which the user equipment does not attempt data detection.

In another aspect, a method of relaying data in a wireless communication system is provided. The method comprising: receiving data from a user equipment over a first subframe; and relaying the data to a base station over a second subframe placed after one or more subframes from the first subframe, wherein at least any one of the second subframe and a third subframe which is used for the base station to receive the data is a non-detection subframe to which the user equipment does not attempt data detection.

Advantageous Effects

Efficient data transmission between a base station and a relay station is possible as compared with a conventional method of configuring a subframe. Furthermore, data transmission is possible with high radio resource allocation efficiency.

DESCRIPTION OF DRAWINGS

FIG. 22 shows an example in which radio resources are allocated to the conventional reference signal of a downlink subframe.

FIG. 23 shows an example in which radio resources are allocated to the reference signal of an MBSFN subframe according to the present embodiment.

MODE FOR INVENTION

WCDMA (Wideband CDMA) can be implemented using radio technologies, such as UTRAN (Universal Terrestrial Radio Access Network) according to the 3GPP standards. CDMA2000 is CDMA-based radio technology. HRPD (High Rate Packet Data) in accordance with the 3GPP2 standards provides high packet data service in CDMA2000-based systems. eHRPD (Evolved HRPD) is an evolution of HRPD. TDMA (Time Division Multiple Access) may be implemented using radio technology, such as GSM (Global System for Mobile communications), GPRS (General Packet Radio Service), and EDGE (Enhanced Data rates for GSM Evolution). OFDMA (Orthogonal Frequency Division Multiple Access) may be implemented using radio technology, such as IEEE 802.11 (Wi-Fi), IEEE 802.16 (WiMAX), IEEE 802-20, and E-UTRAN (Evolved-UTRAN).

LTE (Long Term Evolution) is a part of E-UMTS (Evolved-UMTS) using an E-UTRAN. LTE adopts OFDMA in downlink and adopts SC-FDMA (Single Carrier FDMA) in uplink. LTE-A (LET-Advanced) is an evolution of LTE. For clarity of a description, 3GPP LTE/LTE-A are hereinafter chiefly described, but the technical spirit of the present invention is not limited thereto.

Figure 1:
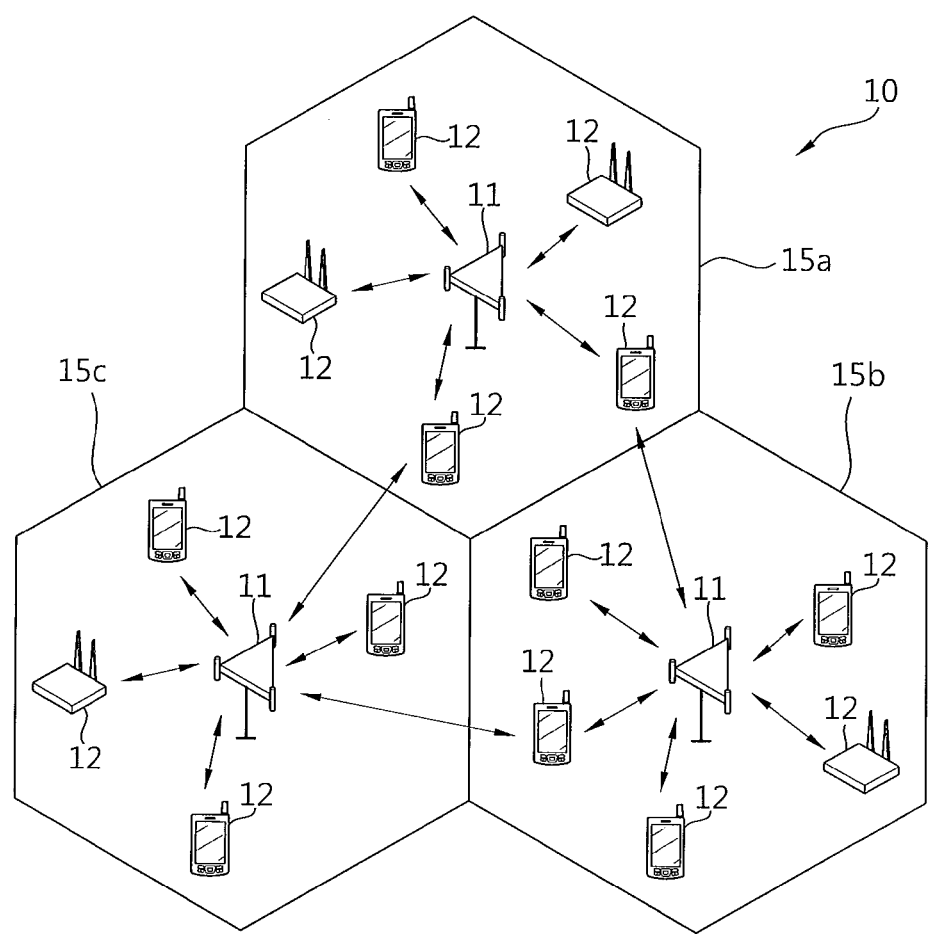
FIG. 1 shows a wireless communication system.

FIG. 1 shows a wireless communication system.

Referring to FIG. 1, the wireless communication system 10 includes at least one base station (BS) 11. The BSs 11 provide communication services to respective geographical areas (commonly called cells) 15a, 15b, and 15c. Each of the cells may be subdivided into a number of areas (called sectors). One or more cells may exist in one BS.

A User Equipment (UE) 12 may be fixed or mobile and may be referred to as another terminology, such as an MS (Mobile Station), a UE (User Terminal), an SS (Subscriber Station), a wireless device, a PDA (Personal Digital Assistant), a wireless modem, a handheld device, or an AT (Access Terminal). The BS 11 commonly refers to a fixed station which communicates with the UE 12. The BS 11 may be referred to as another terminology, such as an eNB (evolved-NodeB), a BTS (Base Transceiver System), an access point, or an AN (Access Network).

Hereinafter, downlink (DL) refers to communication from a BS to a UE, and uplink (UL) refers to communication from a UE to a BS. In downlink, a transmitter may be part of a BS and a receiver may be part of a UE. In uplink, a transmitter may be part of a UE and a receiver may be part of a BS.

Figure 2:
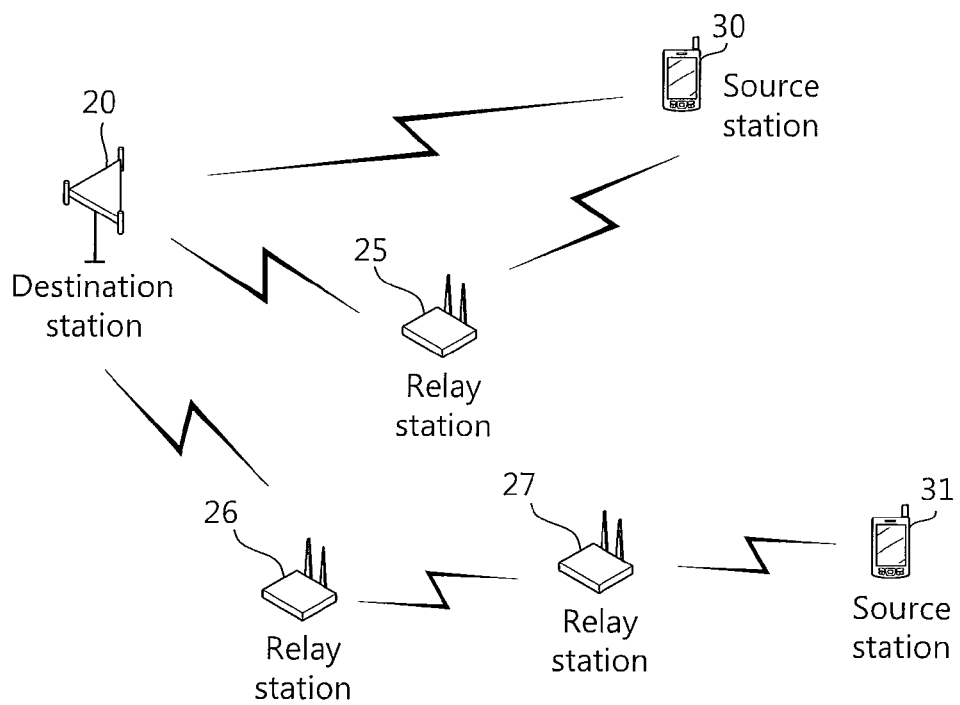
FIG. 2 shows a wireless communication system using a relay station.

FIG. 2 shows a wireless communication system using an RS.

In uplink transmission, a source station may be a UE, and a destination station may be a BS. In downlink transmission, a source station may be a BS, and a destination station may be a UE. A Relay Station (RS) may be a UE, and an additional relaying device may be deployed. A BS can perform functions, such as connectivity, management, control, and resource allocation between an RS and a UE. The RS may be called another terminology, such as a Relay Node (RN).

A BS may have an additional cell ID determined according to each cell. An RS may have or may not have an additional cell ID different from that of a BS. If an RS does not have an additional cell ID, the RS does not generates its own control signal and does not transmit it to a UE. Accordingly, the RS may not exist separately from a BS, but may be recognized as an antenna for transmitting part of or the entire signal generated by the BS, from a viewpoint of the UE. An RS is hereinafter referred to as an 'RS which is not seen by UEs as a separate cell'.

Referring to FIG. 2, a destination station 20 communicates with a source station 30 through an RS 25. In uplink transmission, the source station 30 transmits uplink data to the destination station 20 and the RS 25, and the RS 25 retransmits the received data. The destination station 20 also communicates with a source station 31 through RSs 26 and 27. In uplink transmission, the source station 31 transmits uplink data to the destination station 20 and the RSs 26 and 27, and the RSs 26 and 27 retransmit the received data sequentially or at the same time.

Although the one destination station 20, the three RSs 25, 26, and 27, and the two source stations 30 and 31 are illustrated in FIG. 2, but not limited thereto. The number of each of destination stations, RSs, and source stations included in a wireless communication system is not limited. Any method, such as AF (Amplify and Forward) or DF (Decode and Forward), may be used as a relay method used in an RS, and the technical feature of the present invention is not limited to the above method.

Hereinafter, in a wireless communication system using an RS, a UE which connects with a BS and communicates with the BS is called a macro UE, and a UE which connects with an RS and communicates with the RS is called a relay UE. A UE is used to generally refer to a macro UE and a relay UE, but may be used to refer to a macro UE or a relay UE, unless otherwise described.

Figure 3:
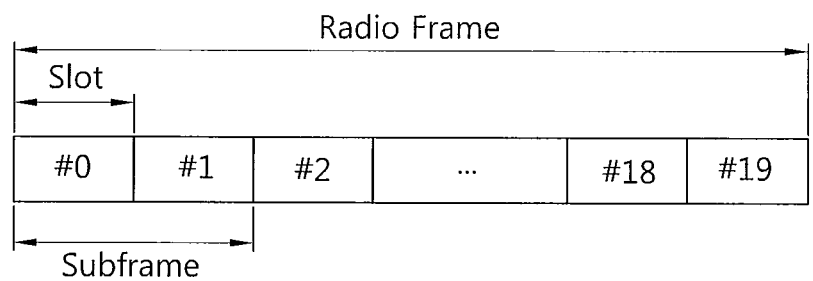
FIG. 3 shows the structure of an FDD radio frame in a 3GPP LTE system.

FIG. 3 shows the structure of an FDD (Frequency Division Duplex) radio frame in a 3GPP LTE system.

Referring to FIG. 3, the radio frame includes ten subframes. One subframe consists of two slots. The time taken to transmit one subframe is called a TTI (Transmission Time Interval). For example, the length of one subframe may be 1 millisecond (ms) and the length of one slot may be 0.5 ms.

Figure 4:
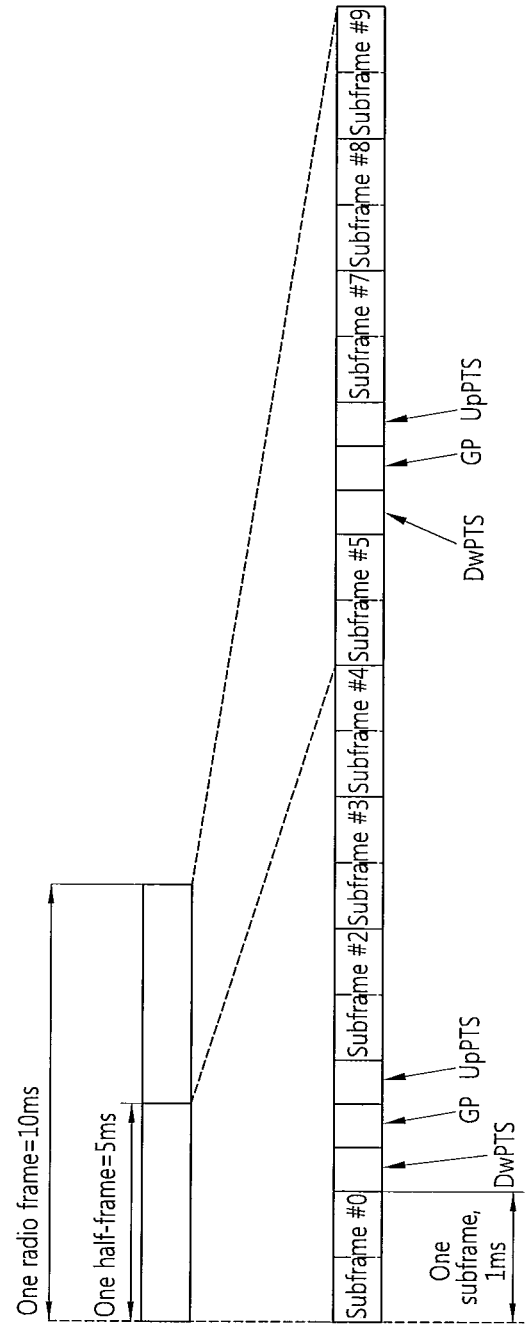
FIG. 4 shows the structure of a TDD radio frame in a 3GPP LTE system.

FIG. 4 shows the structure of a TDD (Time Division Duplex) radio frame in a 3GPP LTE system.

Referring to FIG. 4, one radio frame has a length of 10 ms and consists of two half-frames each having a length of 5 ms. Furthermore, one half-frame consists of five subframes each having a length of 1 ms. In TDD, one subframe may be designated as any one of an uplink (UL) subframe, a downlink (DL) subframe, and a special subframe. One radio frame includes at least one UL subframe and at least one DL subframe. One subframe consists of two slots. For example, the length of one subframe may be 1 ms, and the length of one slot may be 0.5 ms.

The special subframe is a specific period for separating uplink and downlink between an UL subframe and a DL subframe. At least one special subframe exists in one radio frame. The special subframe includes a DwPTS (Downlink Pilot Time Slot), a guard period (GP), and an UpPTS (Uplink Pilot Time Slot). The DwPTS is used for initial cell search, synchronization, or channel estimation. The UpPTS is used for channel estimation in a BS and for upward transmission synchronization with a UE. The guard period is a period for removing interference which is generated in uplink owing to multi-path delay of a DL signal between uplink and downlink.

In FDD and TDD radio frames, one slot includes a plurality of OFDM (orthogonal frequency division multiplexing) symbols in the time domain and a plurality of Resource Blocks (RB) in the frequency domain. The OFDM symbol is used to represent one symbol period because 3GPP LTE adopts OFDMA in downlink. The OFDM symbol may be called an SC-FDMA symbol or a symbol period according to a multiple access scheme. The RB is a unit of resource allocation, and it includes a plurality of consecutive subcarriers in one slot.

For the structures of the radio frames described with reference to FIGS. 3 and 4, reference can be made to Sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

The structure of the radio frame is only illustrative, and the number of subframes included in the radio frame, the number of slots included in the subframe, or the number of OFDM symbols included in the slot may be changed in various ways.

Figure 5:
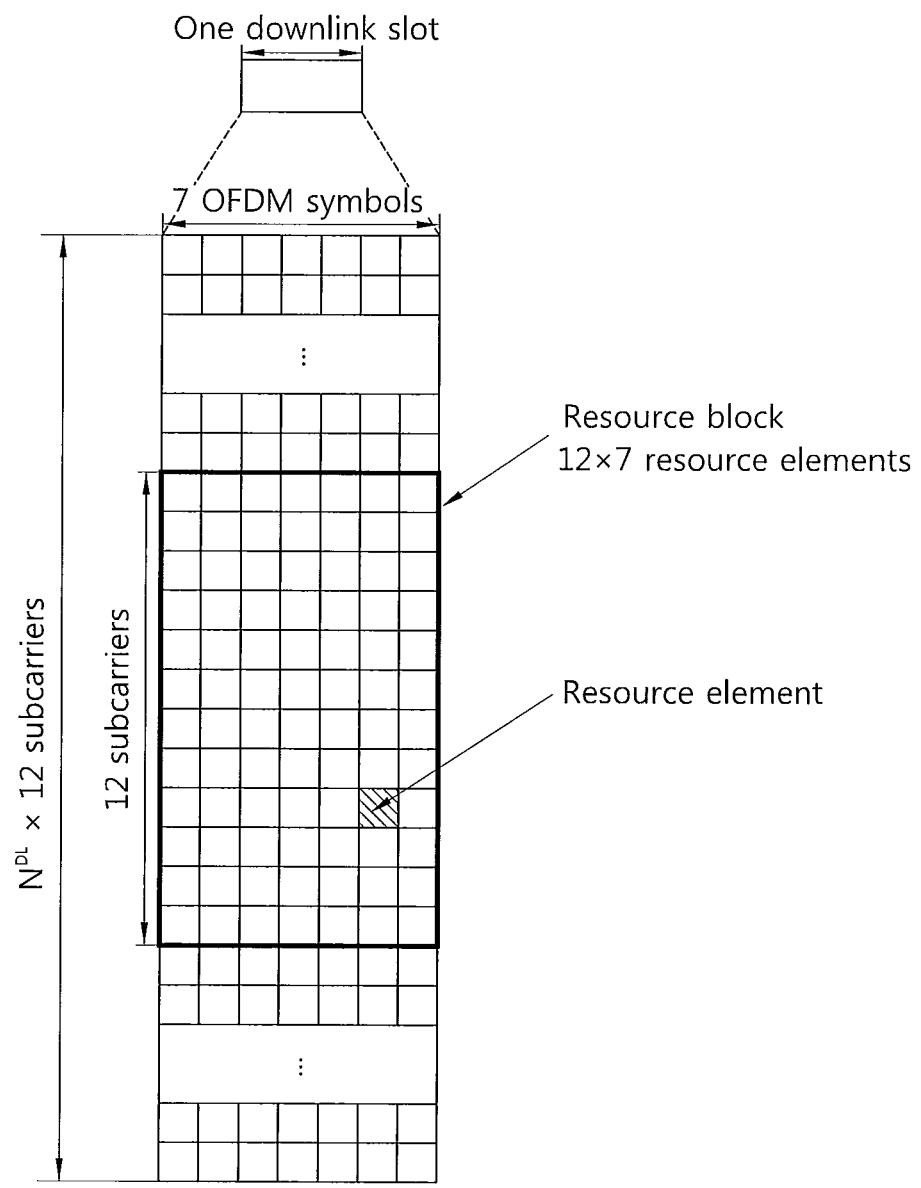
FIG. 5 is an exemplary diagram showing a resource grid for one downlink slot.

FIG. 5 is an exemplary diagram showing a resource grid for one downlink slot.

Referring to FIG. 5, one downlink slot includes a plurality of OFDM symbols in the time domain. Here, one downlink slot is illustrated to include 7 OFDMA symbols and one resource block (RB) is illustrated to include 12 subcarriers in the frequency domain, but not limited thereto.

Each of elements on the resource grid is called a resource element. One resource block (RB) includes 12×7 resource elements. The number of resource blocks $N^{DL}$ included in the downlink slot is dependent on a DL transmission bandwidth which is configured in a cell.

Figure 6:
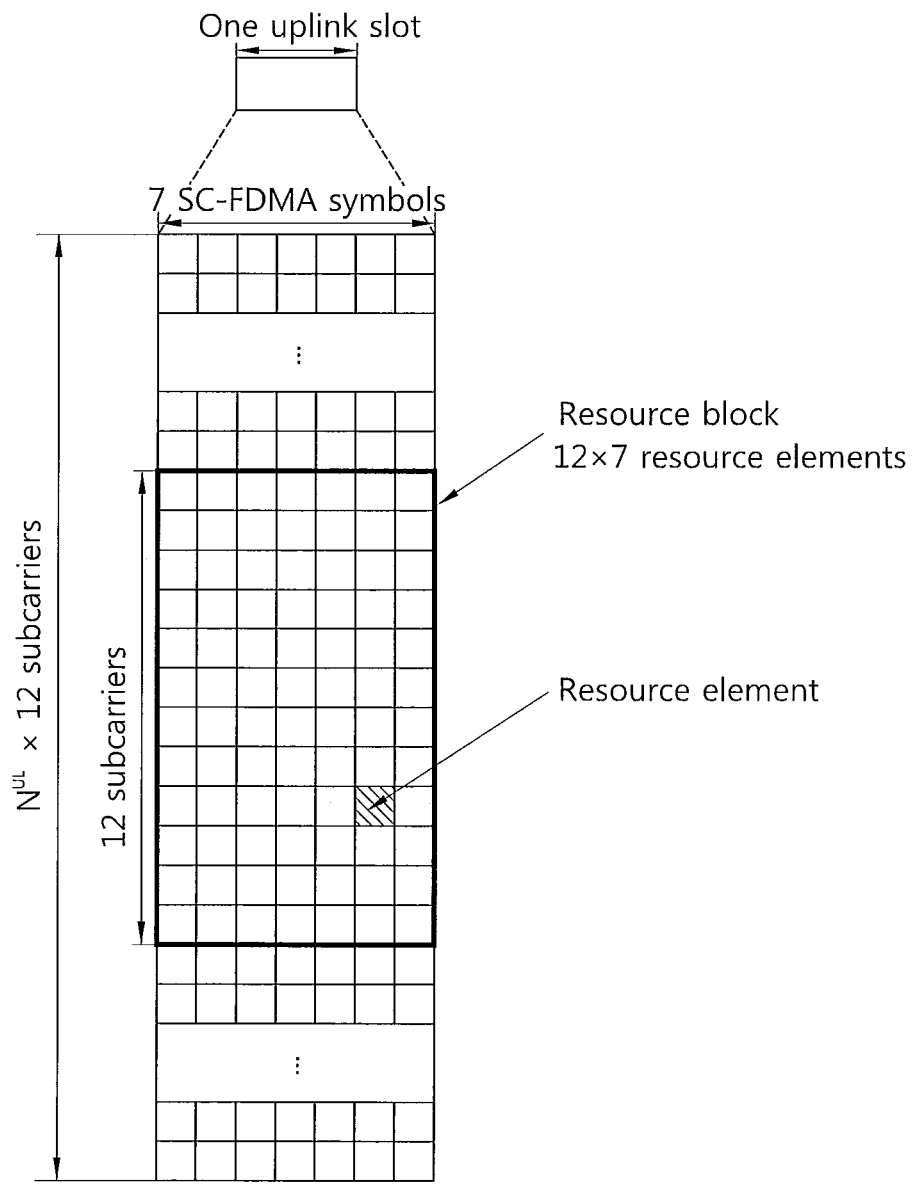
FIG. 6 is an exemplary diagram showing a resource grid for one uplink slot.

FIG. 6 is an exemplary diagram showing a resource grid for one uplink slot.

Referring to FIG. 6, one uplink slot includes a plurality of SC-FDMA symbols or a plurality of OFDMA symbols in the time domain and a plurality of resource blocks (RB) in the frequency domain. Here, one uplink slot is illustrated to include 7 SC-FDMA symbols and one resource block is illustrated to include 12 subcarriers, but not limited to. The number of resource blocks $N^{UL}$ included in the downlink slot is dependent on a UL transmission bandwidth which is configured in a cell.

Figure 7:
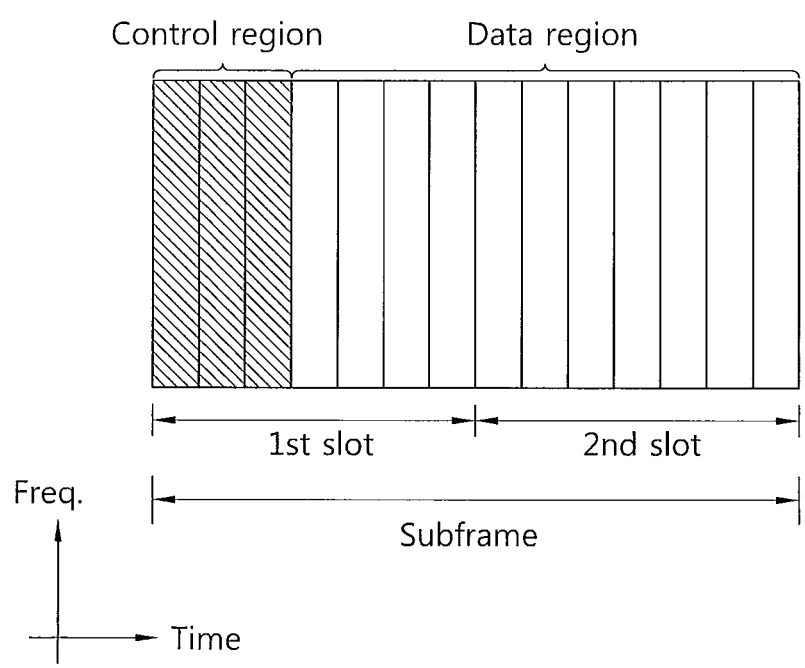
FIG. 7 shows an example of the structure of a downlink subframe.

FIG. 7 shows an example of the configuration of a DL subframe.

Referring to FIG. 7, the DL subframe includes two slots. A maximum of three former OFDM symbols in the first slot within the subframe correspond to a control region to which control channels are allocated. The remaining OFDM symbols may become a data region to which PDSCHs (Physical Downlink Shared Channel) are allocated.

DL control channels include a PCFICH (Physical Control Format Indicator Channel), a PDCCH (Physical Downlink Control Channel), a PHICH (Physical Hybrid-ARQ Indicator Channel) and the like. The PCFICH transmitted in the first OFDM symbol of a subframe carries information about the number of OFDM symbols (i.e., the size of the control region) which are used to transmit control channels within the subframe. Control information transmitted over the PDCCH is called Downlink Control Information (DCI). The DCI indicates UL resource allocation information, DL resource allocation information, and a UL transmit power control command for certain UE groups. The PHICH carries ACK (Acknowledgement)/NACK (Not-Acknowledgement) signals for the HARQ (Hybrid Automatic Repeat Request) of uplink data. That is, the ACK/NACK signals for uplink data which are transmitted by UEs are transmitted over the PHICH.

A DL subframe may be configured as a non-detection subframe to which a UE does not attempt data detection (e.g., a UE does not detect a reference signal and does not measure a reference signal). The non-detection subframe may be, for example, an MBSFN (Multicast/Broadcast Single Frequency Network) subframe.

The MBSFN subframe may be used for two kinds of uses. The first use is for MBMS (Multimedia Broadcast Multicast Service). MBMS is service in which the same signals are transmitted at the same time in the several cells of a wireless communication system. Signals for MBMS are transmitted at the same time in several cells. Accordingly, MBMS must be different from unicast in which different data is transmitted in terms of a method of inserting a reference signal. To this end, a BS informs a UE of the position of a subframe over which an MBMS signal is transmitted, and a reference signal insertion method different from unicast is used in the relevant subframe.

The second use is to allow a UE, having a BS or an RS connected thereto, not to perform an operation of receiving an unnecessary signal and reference signal measurement. For example, in 3GPP LTE, if a UE does not receive any signal including a reference signal in a specific subframe, there is a possibility that the UE may malfunction. In order to prevent this problem, a subframe over which an RS receives downlink data from a BS is configured as an MBSFN subframe, and the RS informs a UE of the configured MBSFN subframe. Accordingly, the UE (more particularly, a 3GPP LTE release-8 UE) does not detect a reference signal in the MBSFN subframe and does not perform reference signal measurement. In the present invention, an MBSFN subframe may be used for the second use.

Figure 8:
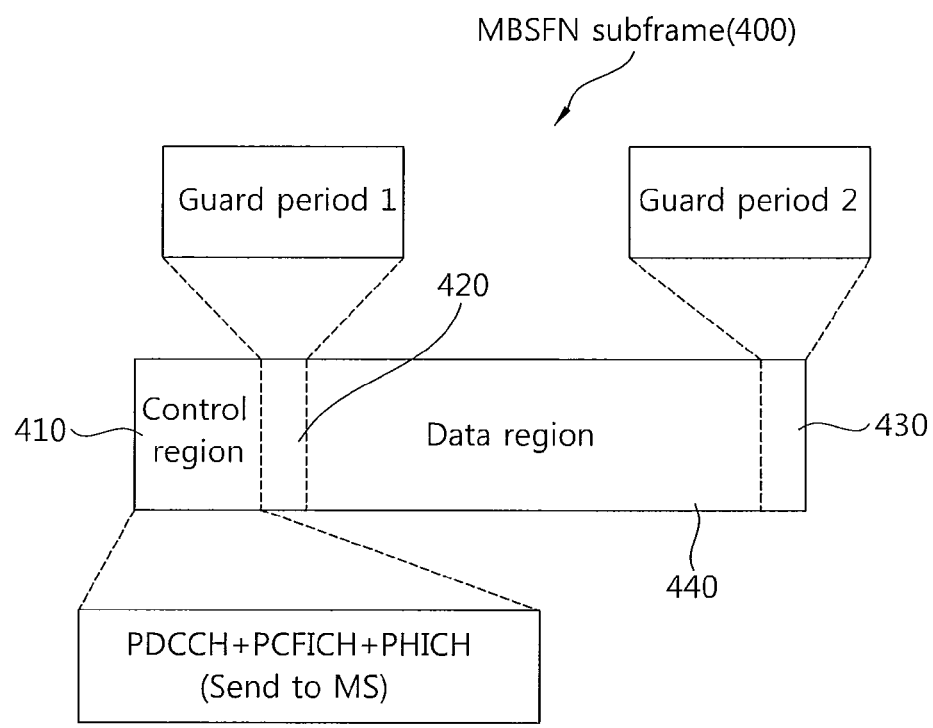
FIG. 8 is a diagram showing the structure of a conventional MBSFN subframe.

FIG. 8 is a diagram showing the configuration of an MBSFN subframe which is used for the second use in a conventional method. That is, the MBSFN subframe of FIG. 8 shows a structure which is used to allow a UE, having a BS or an RS connected thereto, not to perform an operation of receiving an unnecessary signal and reference signal measurement.

Referring to FIG. 8, the MBSFN subframe 400 may include a control region 410, a guard period 1 420, a guard period 2 430, and a data region 440.

The control region 410 is a part to which control signals transmitted over control channels, such as a PCFICH, a PDCCH, and a PHICH, are allocated. The control signals may inform UEs that downlink data will not be transmitted so that the UEs do not perform an unnecessary data reception operation. For example, an RS may inform a UE that a specific subframe is an MBSFN subframe by using two OFDM symbols which are transmitted in the control region 410 of the MBSFN subframe. Accordingly, the UE does not perform reference signal measurement in the remaining period of the specific subframe other than the two OFDM symbols.

An RS may transmit the control signals of the control region 410 in a subframe, configured as an MBSFN subframe, to a UE and then receive data from a BS in the data region 440 subsequent to the guard period 1 420.

The guard period 1 420 and the guard period 2 430 are intervals for removing interference between data transmission and data reception. The guard period 1 and the guard period 2 may be changed in various ways according to propagation delay between a BS and an RS.

A PDCCH (i.e., a DL physical channel) is described below.

The PDCCH can carry information about resource allocation and a transmission format of a DL-SCH (Downlink Shared Channel), resource allocation information about an UL-SCH (Uplink Shared Channel), paging information on a PCH (Paging Channel), system information on a DL-SCH, information about resource allocation of a high layer control message such as a random access response transmitted over a PDSCH, a set of transmit power control commands for UEs within a certain UE group, the activation of a VoIP (Voice over Internet Protocol) and the like. A plurality of PDCCHs may be transmitted within the control region, and a UE can monitor the plurality of PDCCHs. The PDCCHs are transmitted over one CCE (Control Channel Element) or over an aggregation of several consecutive CCEs. The CCE is a logical allocation unit for providing the PDCCH with the coding rate according to the state of a radio channel. The CCE may consist of a plurality of Resource Element Groups (REG), and the REG may consist of four resource elements. The format of a PDCCH and the number of bits of a PDCCH are determined according to a correlation between the number of CCEs and the coding rate provided by the CCEs. Control information transmitted over the PDCCH is called Downlink Control Information (DCI).

Table 1 shows the structure of a radio frame which can be configured according to the arrangements of UL subframes and DL subframes in a 3GPP LTE TDD system. In Table 1, 'D' indicates a DL subframe, 'U' indicates a UL subframe, and 'S' indicates a special subframe.

TABLE 1

| UL-DL Con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A point of time at which downlink is switched to uplink and at which uplink is switched to downlink is called a switching point. In Table 1, a switch-point periodicity refers to a period where a shape in which a UL subframe and a DL subframe are switched is identically repeated. The switch-point periodicity is 5 ms or 10 ms. For example, in a UL-DL configuration 0, the switch-point periodicity is D->S->U->U->U from $0^{th}$ to fourth subframes and is D->S->U->U->U from fifth to ninth subframes like in the previous one. Since one subframe is 1 ms, the switching point periodicity is 5 ms. That is, the switching point periodicity is smaller than the length (10 ms) of one radio frame and the shape in which subframes are switched within a radio frame is once repeated.

A BS or an RS can configure a DL subframe as an MBFSN the subframe in Table 1 and then receive and transmit data. In this case, there is a subframe which cannot be configured as an MBSFN subframe. For example, in the case where a wireless communication system is a 3GPP LTE system and i) operated in the TDD mode, the subframes 0, 1, 5, and 6 cannot be configured as an MBSFN subframe. In the case where a wireless communication system is a 3GPP LTE system and ii) operated in the FDD mode, the subframes 0, 4, 5, and 9 cannot be configured as an MBSFN subframe. This is because the relevant subframes are subframes used to transmit essential control signals, such as synchronization signals (e.g., a primary synchronization signal and a secondary synchronization signal), to a UE.

A method of transmitting and receiving data between a BS and an RS in a conventional 3GPP LTE TDD system is described below.

Figure 9:
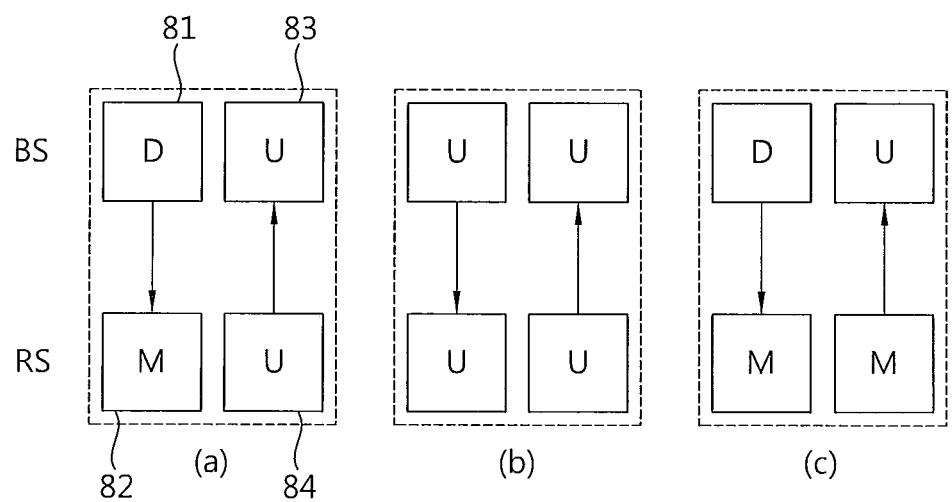
FIG. 9 shows examples of subframes configured when a base station and a relay station transmit data in a conventional 3GPP LTE TDD system.

FIG. 9 shows examples of subframes configured when a BS and an RS transmit data in a conventional 3GPP LTE TDD system. In FIG. 9, 'M', and 'U' sequentially indicate a DL subframe, an MBSFN subframe, and a UL subframe. An arrow indicates a transmission direction.

Referring to FIG. 9(a), in relation to a time interval (i.e., a specific subframe) in which a BS transmits data to an RS, the BS configures the specific subframe as a DL subframe 81, and the RS configures the specific subframe as an MBSFN subframe 82. In relation to a time interval (i.e., a specific subframe) in which the RS transmits data to the BS, the RS configures the specific subframe as a UL subframe 84, and the BS configures the specific subframe as a UL subframe 83.

Referring to FIG. 9(b), when a BS transmits data to an RS, the BS configures a subframe as a UL subframe, and the RS also configures the subframe as a UL subframe. When an RS transmits data to a BS, the RS configures a relevant subframe as a UL subframe, and the BS also configures the relevant subframe as a UL subframe.

Referring to FIG. 9(c), when a BS transmits data to an RS, the BS configures a subframe as a DL subframe and the RS configures the subframe as an MBSFN subframe. When the RS transmits data to the BS, the RS configures a subframe as an MBSFN subframe, and the BS configures the subframe as a UL subframe.

In a wireless communication system including an RS, a BS must allocate one or more UL subframes and one or more DL subframes which will be used for communication with a macro UE in one radio frame. Furthermore, an RS must allocate one or more UL subframes and one or more DL subframes which will be used for communication with a relay UE in one radio frame. However, in the conventional subframe configuration methods described with reference to FIG. 9, such allocation may not be possible. In other words, the relay operation of an RS is not guaranteed for all the configurations of Table 1.

Figure 10:
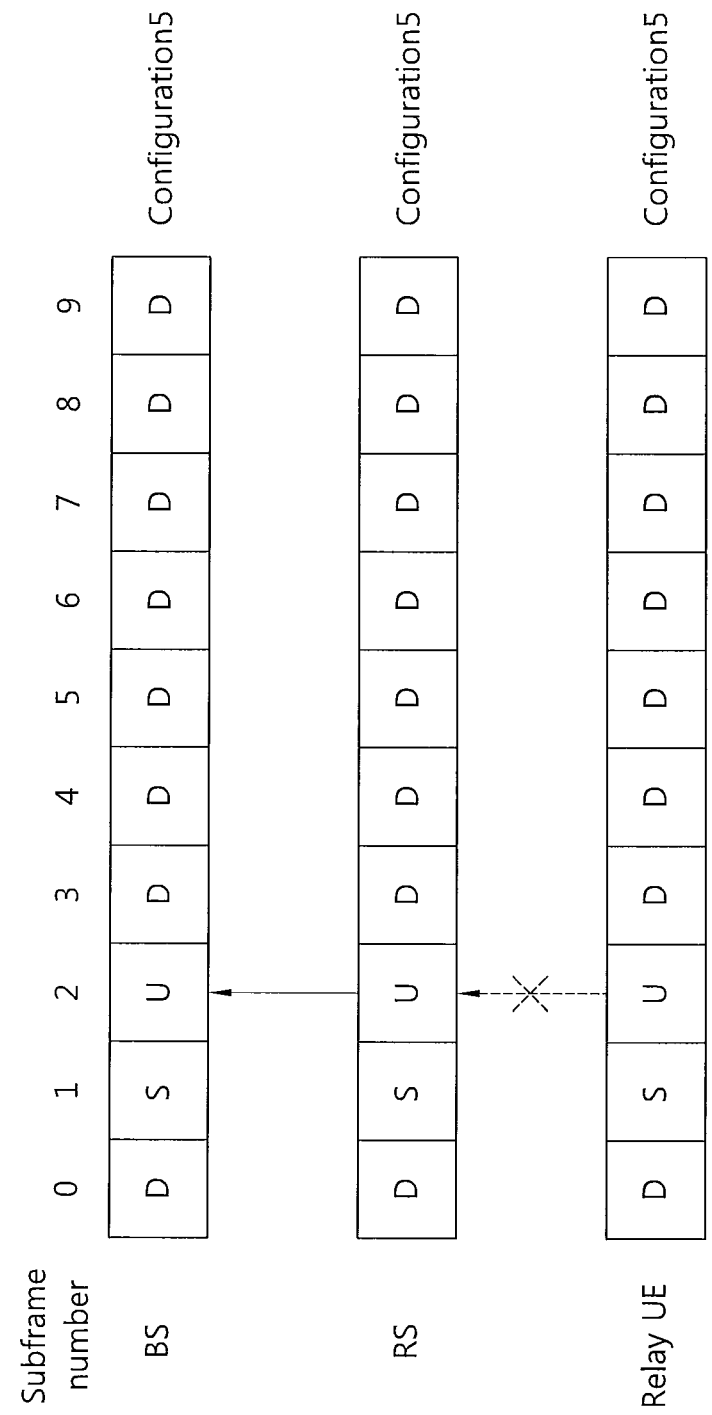
FIG. 10 is a diagram showing an example in which the relay operation of a relay station cannot be guaranteed.

FIG. 10 is a diagram showing a conventional example in which the relay operation of an RS cannot be guaranteed. Referring to FIG. 10, a radio frame having the configuration 5 of Table 1 (i.e., 'DSUDDDDDDD') may be configured in relation to a BS, an RS, and a relay UE. In this case, only one UL subframe is included on the radio frame. If the RS transmits data to the BS in a subframe 2 (i.e., only one UL subframe), the RS cannot receive data from the relay UE in the subframe 2 owing to self-interference. That is, in the entire radio frame, the RS cannot allocate the UL subframe to communication with the relay UE. Accordingly, the relay operation of the RS cannot be guaranteed.

In accordance with a method of relaying data according to an embodiment of the present invention, the above problem can be solved. The method of relaying data according to the embodiment of the present invention may be applied to a 3GPP LTE TDD-based system. An example in which a BS transmits data to an RS is first described.

Figure 11:
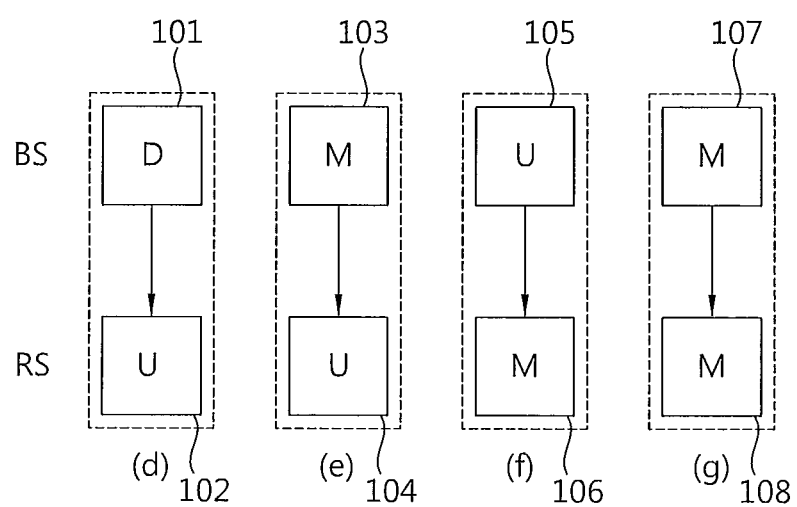
FIG. 11 shows examples of subframes configured when a base station transmits data to a relay station.

FIG. 11 shows examples of subframes configured when a BS transmits data to an RS.

Referring to FIG. 11(d), the BS configures a subframe over which data is transmitted as a DL subframe 101, and the RS configures a subframe over which data is received as a UL subframe 102. For the clarity of description, the names of subframes are hereinafter classified according to an entity which transmits a signal in relation to the same time interval (i.e., a specific subframe). For example, a subframe over which a BS transmits a signal is referred to as a first subframe and the same time interval or a subframe over which an RS receives a signal is referred to as a second subframe (The first subframe and the second subframe may be accurately synchronized between the BS and the RS, but may have a slight offset according to circumstances). Data transmitted over the first subframe by the BS is received over the second subframe by the RS, but the first subframe may be configured as a DL subframe and the second subframe may be configured as a UL subframe.

Data transmitted over the first subframe by the BS is received over the second subframe by the RS, but at least any one of the first and the second subframes may be a non-detection subframe (e.g., an MBSFN subframe) to which a UE does not attempt data detection. For example, in the case where the BS configures the first subframe as an MBSFN subframe, a macro UE does not attempt data detection (i.e., the macro UE does not detect a reference signal and does not perform reference signal measurement). Furthermore, in the case where the RS configures the second subframe as an MBSFN subframe, a relay UE does not attempt data detection (i.e., the relay UE does not detect a reference signal and does not perform reference signal measurement). These examples are described with reference to FIG. 11(e) to (g).

Referring to FIG. 11(e), the BS configures the first subframe over which data is transmitted as an MBSFN subframe 103, and the RS configures the second subframe over which data is received as a UL subframe 104.

It is preferred that the method of FIG. 11(d) or (e) be applied to a radio frame configuration in which a BS has greater DL subframes than an RS. For example, it is preferred that the method of FIG. 11(d) or (e) be applied in the case where the BS is configured in the configuration 1 of Table 1 (DL-UL configuration 1) and the RS is configured in the configuration 0 of Table 1 (DL-UL configuration 0).

Referring to FIG. 11(f), the BS configures the first subframe over which data is transmitted as a UL subframe 105, and the RS configures the second subframe over which data is received as an MBSFN subframe 106. It is preferred that the method of FIG. 11(f) be applied to a radio frame configuration in which an RS has greater DL subframes than a BS. For example, it is preferred that the methods of FIG. 11(f) be applied in the case where the BS is configured in the configuration 0 of Table 1 and the RS is configured in the configuration 1 of Table 1.

Referring to FIG. 11(g), both the first subframe and the second subframe are configured as MBSFN subframes 107 and 108. In the prior art, a BS configures the first subframe as a DL subframe, and an RS configures the second subframe as an MBSFN subframe. The present invention differs from the prior art in that a BS configures the first subframe over which a signal is transmitted as an MBSFN subframe. Furthermore, since the BS configures the first subframe as the MBSFN subframe, macro UEs do not perform reference signal measurement. Accordingly, there is an advantage in that an additional reference signal different from a common DL subframe can be used.

According to subframe configurations, such as those shown in FIG. 11(d) to (g), the RS can receive a signal from the BS over the second subframe and can relay data to a relay UE over a third subframe which is placed after one or more subframes from the second subframe.

Figure 12:
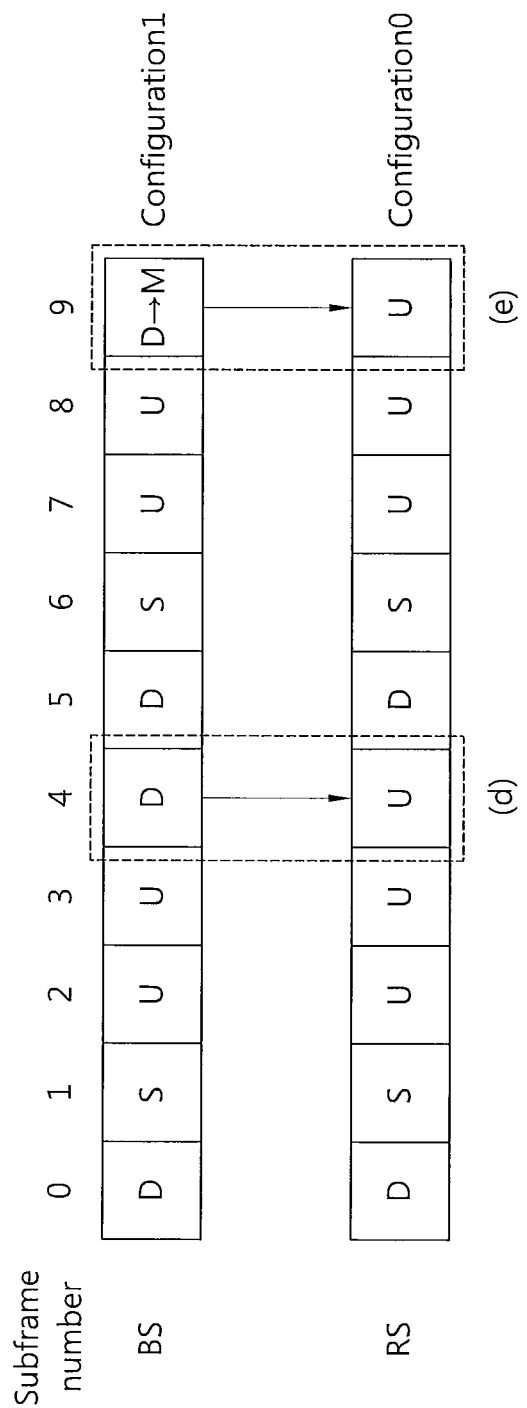
FIGS. 12 to 14 show examples in which the configurations of the subframes described with reference to FIG. 11 are applied to a radio frame when a base station transmits data to a relay station.
Figure 13:
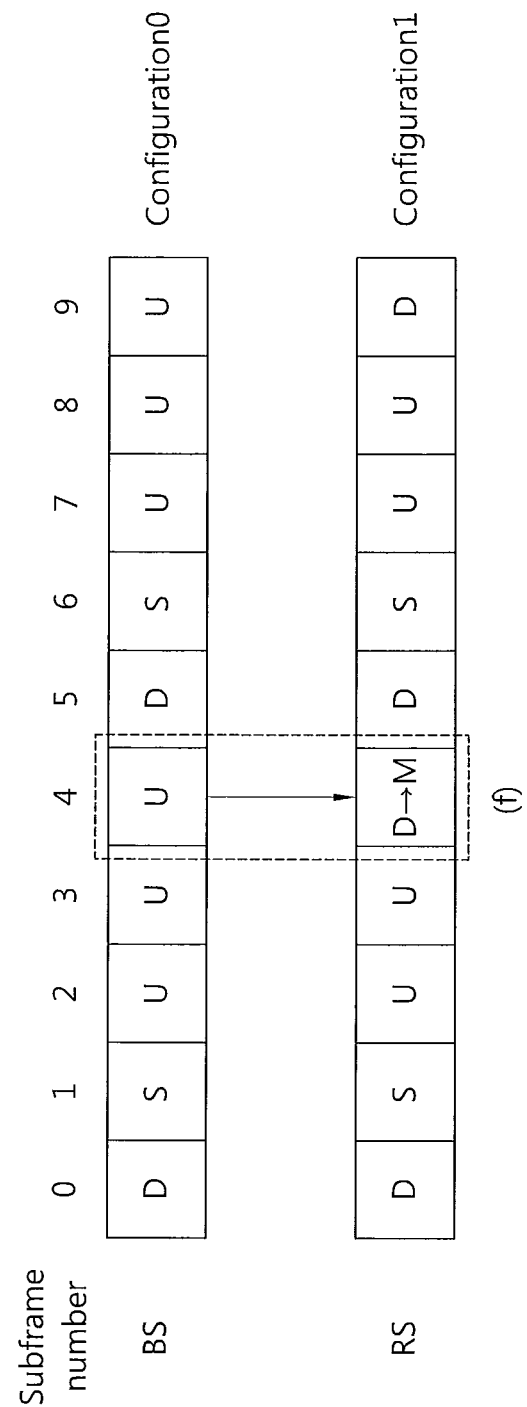
Figure 14:
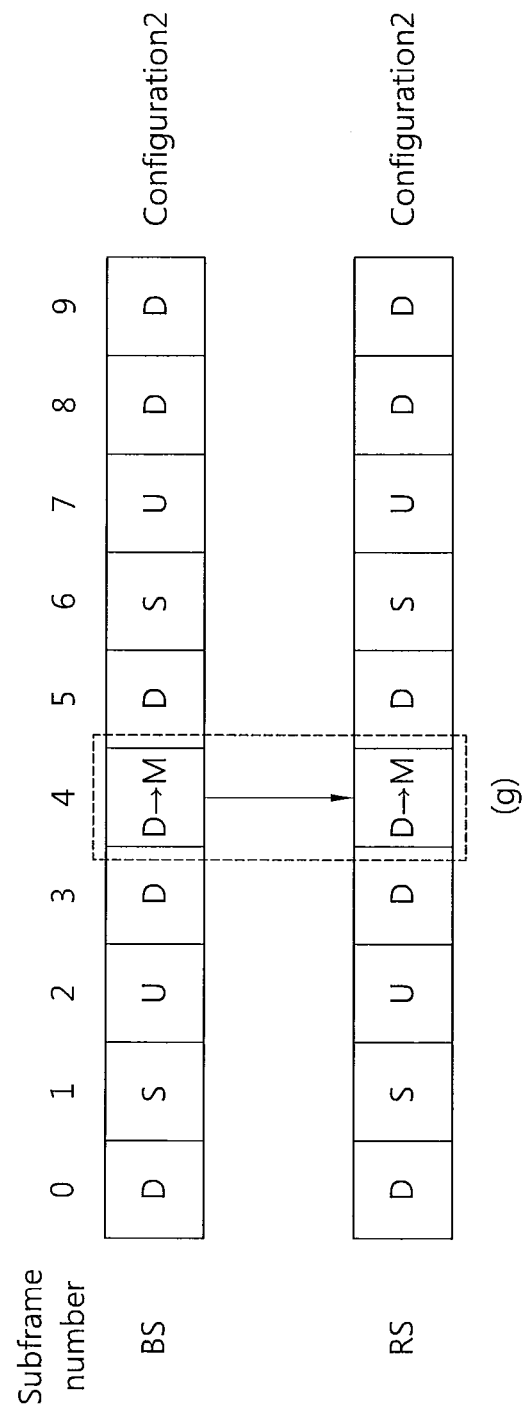

FIGS. 12 to 14 show examples in which the methods of configuring subframes, described with reference to FIGS. 11(d) and (g), are applied to a radio frame when a BS transmits data to an RS.

Referring to FIG. 12, a radio frame is configured according to the configuration 1 of Table 1 in the BS, and a radio frame is configured according to the configuration 0 of Table 1 in the RS. The BS transmits data to the RS in a subframe 4 or a subframe 9 or both ((d), (e)). Referring to FIG. 13, a radio frame is configured according to the configuration 0 of Table 1 in the BS, and a radio frame is configured according to the configuration 1 of Table 1 in the RS. The BS transmits data to the RS in a subframe 4 ((f)). Referring to FIG. 14, radio frames are configured according to the configuration 2 of Table in the BS and the RS. The BS transmits data to the RS in the subframe 4 ((g)).

The configurations of subframes configured when the BS transmits data to the RS, as described above with reference to FIGS. 11 to 14, are summarized in Table 2.

TABLE 2

| eNB(BS) | RS |
|---|---|
| D | U |
| M | U |
| U | M |
| M | M |

An example in which an RS transmits data to a BS is described below.

Figure 15:
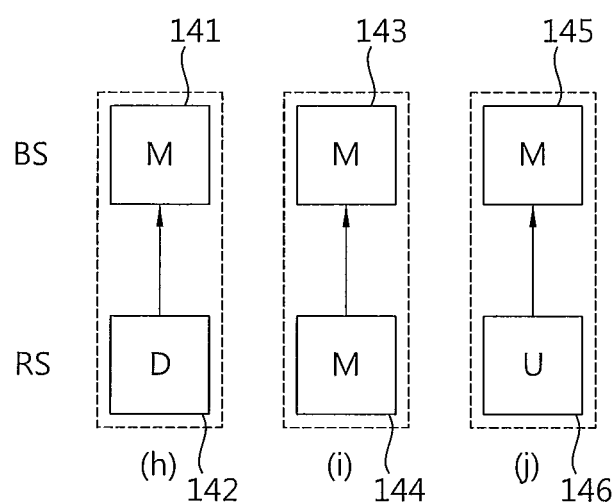
FIG. 15 shows the structures of subframes configured when a relay station transmits data to a base station.

FIG. 15 shows the configurations of subframes configured when an RS transmits data to a BS.

Referring to FIG. 15(*h*), the BS configures a subframe over which data is received as an MBSFN subframe 141, and the RS configures a subframe over which data is transmitted as a DL subframe 142.

Referring to FIG. 15(*i*), the BS configures a subframe over which data is received as an MBSFN subframe 143, and the RS configures a subframe over which data is transmitted as an MBSFN subframe 144. These configuration methods enables the RS to transmit data to the BS, in particular, when only one UL subframe is included within a radio frame (i.e., in case of the configuration 5 of Table 1). This is described later with reference to FIG. 18. In case of FIGS. 15(*h*) and (*i*), the BS and the RS may configure the configurations of the radio frames differently or identically.

Referring to FIG. 15(*j*), the BS configures a subframe over which data is received as an MBSFN subframe 145, and the RS configures a subframe over which data is transmitted as a UL subframe 146. This configuration method is preferable in case of a radio frame configuration when the BS has greater DL subframes than the RS. For example, the BS is configured to have the configuration 1 of Table 1, and the RS is configured to have the configuration 0 of Table 1.

Figure 16:
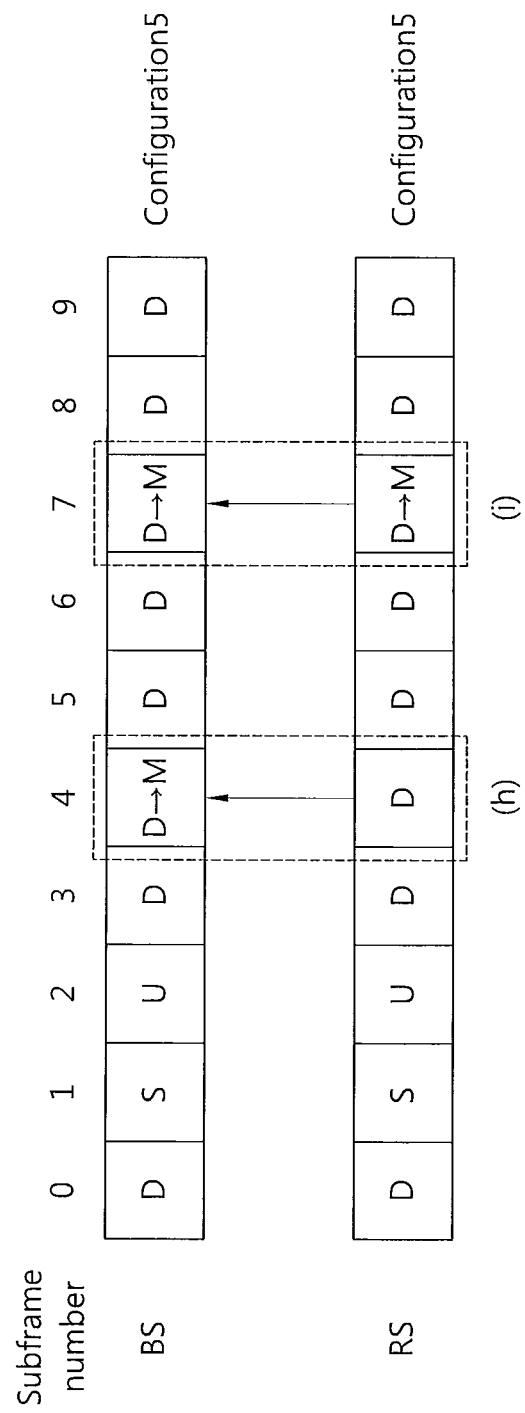
FIGS. 16 and 17 show examples in which the configurations of the subframes described with reference to FIG. 15 are applied to a radio frame when a relay station transmits data to a base station.
Figure 17:
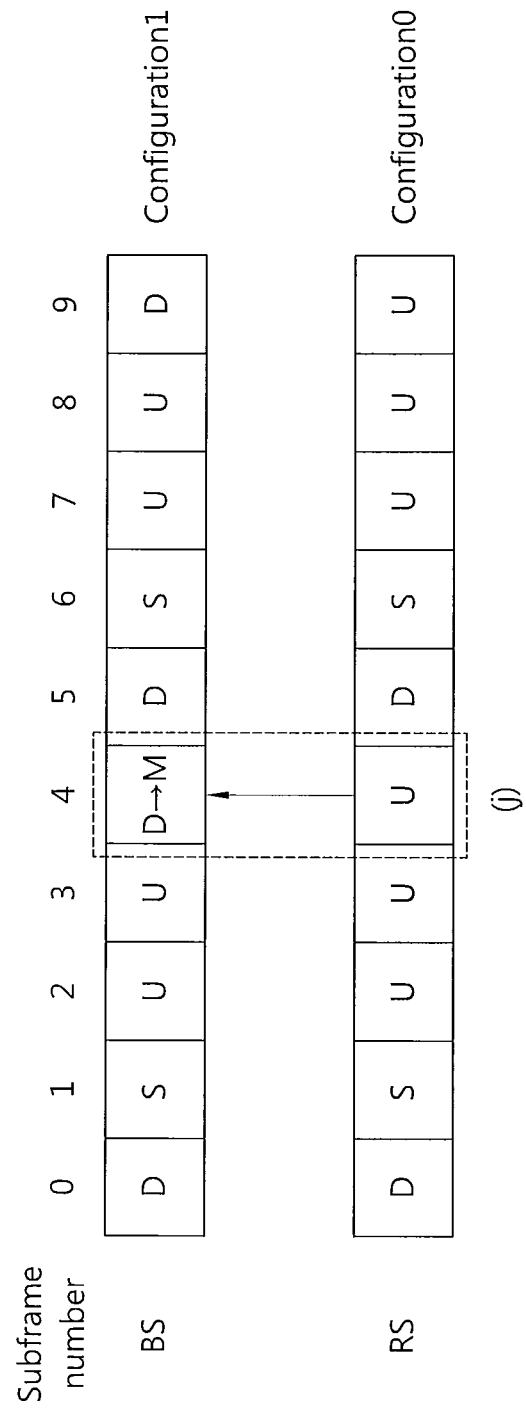

FIGS. 16 and 17 show examples in which the configurations of the subframes described with reference to FIG. 15(*h*) to (j) are applied to a radio frame when an RS transmits data to a BS.

Referring to FIG. 16, in the BS and the RS, a radio frame is configured to have the configuration 5 of Table 1. The RS transmits data to the BS in a subframe 4 or a subframe 7 or both ((*h*), (*i*)). Referring to FIG. 17, a radio frame is configured to have the configuration 1 of Table 1 in the BS, and a radio frame is configured to have the configuration 0 of Table 1 in the RS. The RS transmits data to the BS in a subframe 4 ((*j*)).

The configurations of the subframes which are configured in the case where the RS transmits data to the BS, described with reference to FIGS. 15 to 17, are summarized as in Table 3.

TABLE 3

| eNB(BS) | RS |
|---|---|
| M | D |
| M | M |
| M | U |

That is, in the case where the RS transmits data to the BS, at least any one of the subframe used by the RS in order to transmit data and the subframe used by the BS in order to receive data may be a non-detection subframe (e.g., an MBSFN subframe) to which a UE does not attempt data detection. If a subframe that is used by an RS in order to transmit data is configured as an MBSFN subframe, a relay UE does not attempt data detection. If a subframe that is used by a BS in order to receive data is configured as an MBSFN subframe, a macro UE does not attempt data detection. If an RS configures a subframe used to transmit data to a BS as a DL subframe and a BS configures a subframe used to receive data as an MBSFN subframe, a macro UE does not attempt data detection, but a relay UE can receive data from an RS (e.g., the RS can transmit data to the relay UE using frequency resources different from frequency resources through which data is transmitted to the BS.)

If a BS and an RS configure subframes and transmit and receive data as described above with reference to FIGS. 11 to 17, the relay operation of an RS that cannot be guaranteed using the conventional method can be guaranteed.

Figure 18:
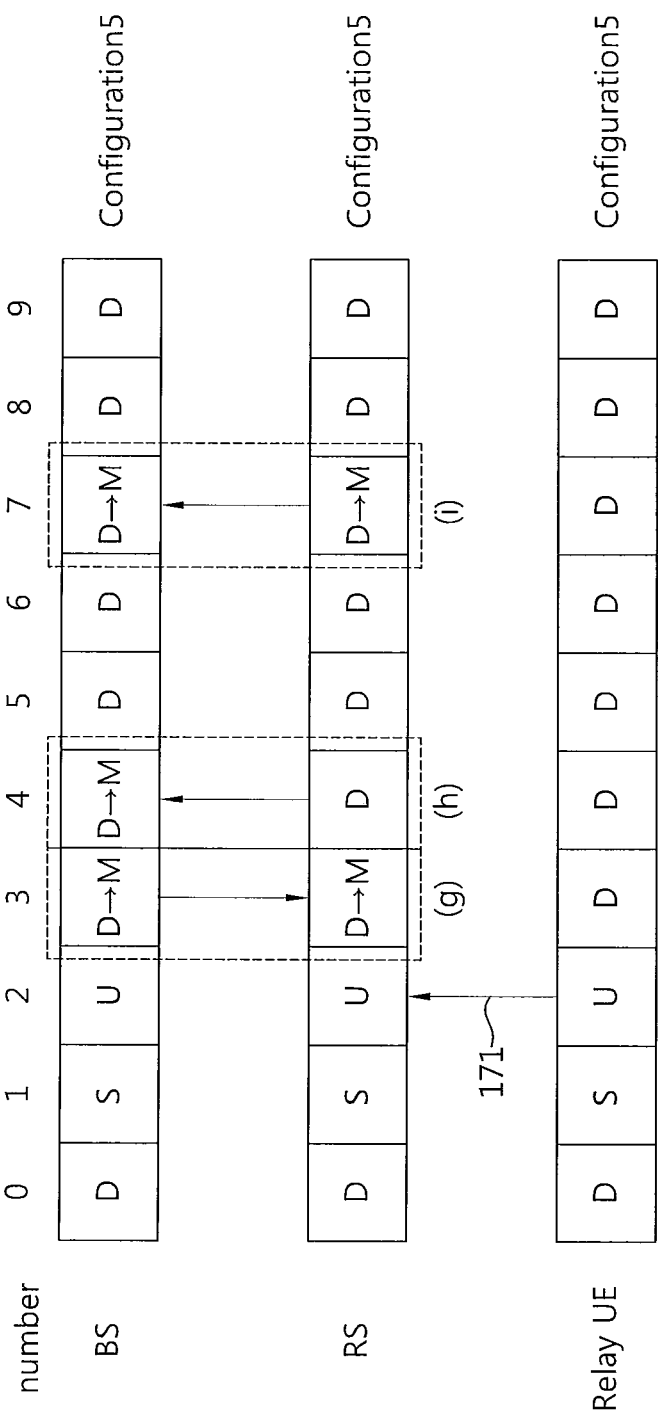
FIG. 18 is a diagram showing an example in which the relay operation of a relay station that could not be guaranteed according to a conventional method can be guaranteed according to the present invention.

FIG. 18 is a diagram showing an example in which the relay operation of an RS that cannot be guaranteed according to the conventional method can be guaranteed according to the present invention.

Referring to FIG. 18, radio frames are configured to have the configuration 5 of Table 1 in all of a BS, an RS, and a relay UE. The relay UE can transmit data to the RS over a subframe 2(171). Furthermore, the BS can transmit data to the RS over a subframe 3((*g*)). Furthermore, the RS can transmit data to the BS over a subframe 4 or a subframe 7 or both ((*h*), (*i*)).

The allocation of radio resources in a non-detection subframe (e.g., an MBSFN subframe) is described below. Although an example applied to an FDD system is described for the clarity of description, those skilled in the art can readily apply the technical feature of the present invention to a TDD system.

Figure 19:
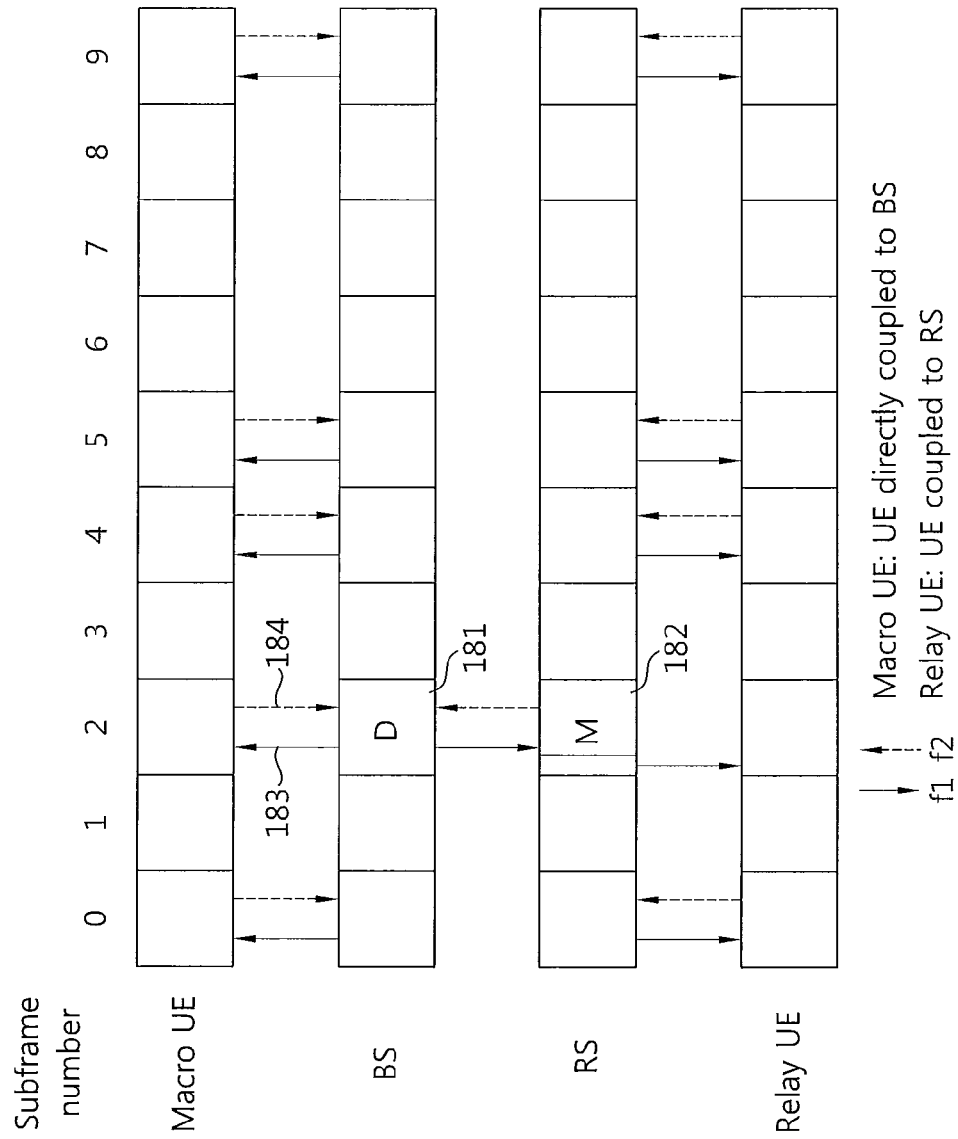
FIG. 19 shows an example of a method of transmitting and receiving data in a 3GPP LTE FDD system.

FIG. 19 shows an example of a method of transmitting and receiving data in a 3GPP LTE FDD system. Referring to FIG. 19, a source station (e.g., a BS) and a destination station (e.g., an RS) transmit data using different frequencies in uplink and downlink of the same subframe (183, 184). In the case where data is transmitted and received between the BS and an RS, the BS configures a relevant subframe as a DL subframe 181, and the RS configures a relevant subframe as an MBSFN subframe 182. As described with reference to FIG. 8, the RS receives data from the BS in the data region 440 other than the control region (410 of FIG. 8), the guard period 1 (420 of FIG. 8), and the guard period 2 (430 of FIG. 8) in the MBSFN subframe. Even when the guard period 1 (420 of FIG. 8) and the guard period 2 (430 of FIG. 8) are not necessarily necessary, the guard periods exist which may make radio resources between the BS and the RS inefficiently used.

Figure 20:
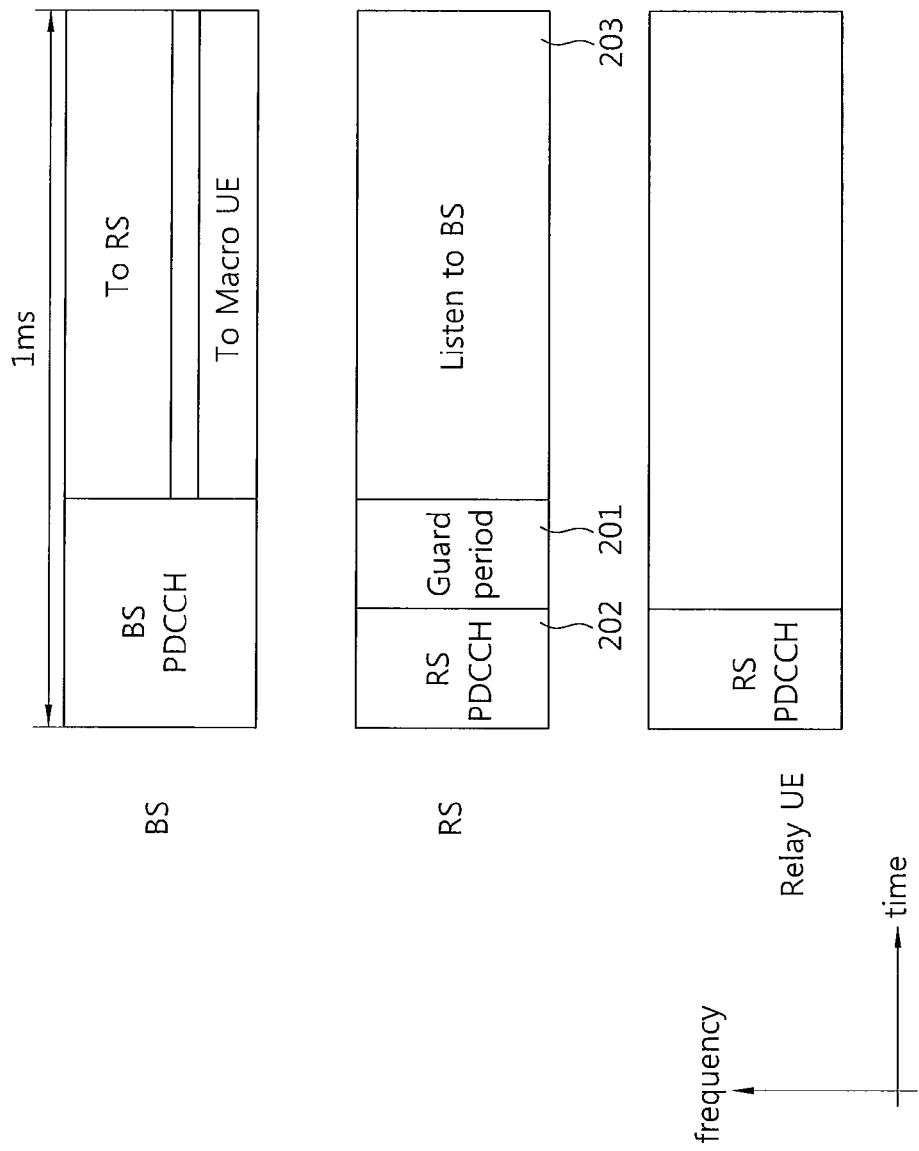
FIGS. 20 and 21 show examples of the configurations of subframes set as MBSFN subframes.
Figure 21:
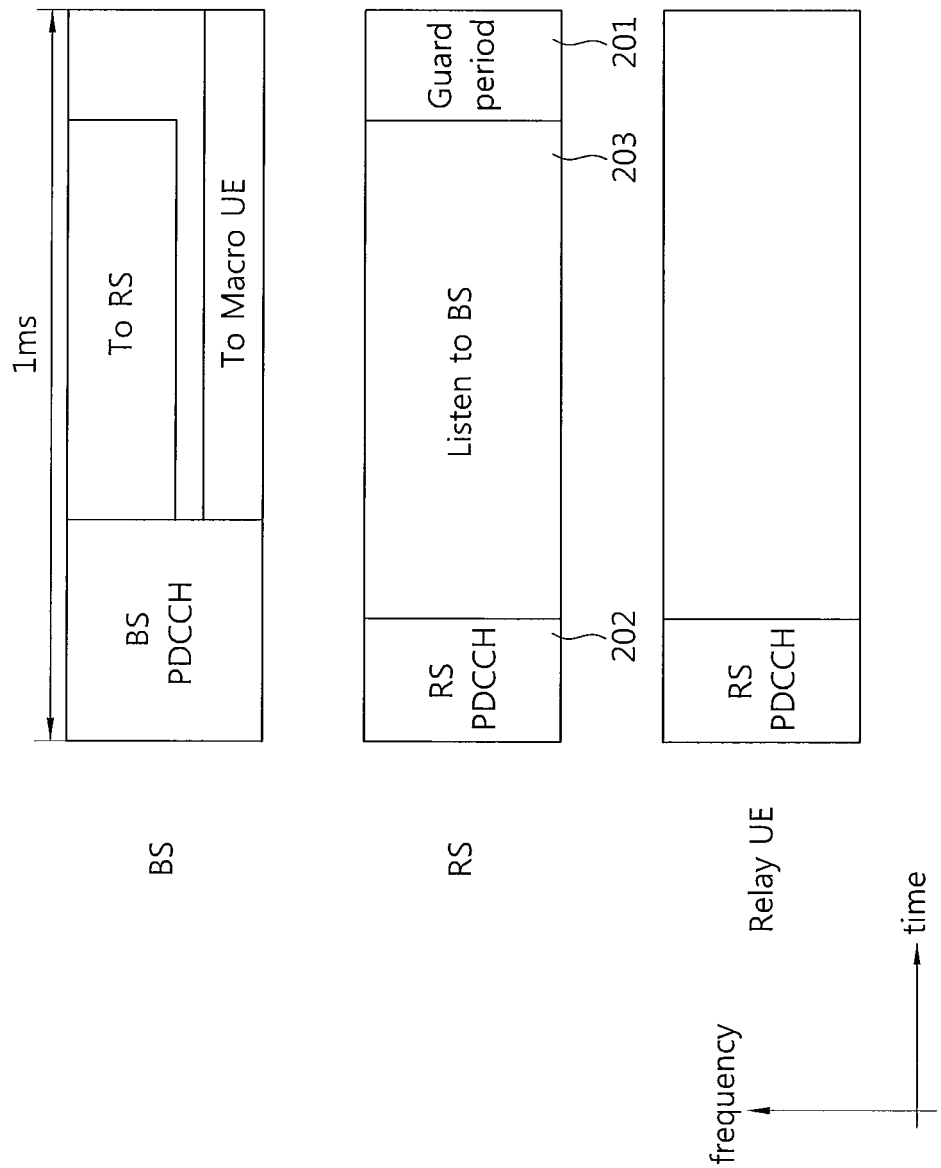

FIGS. 20 and 21 show examples of resource allocation for subframes configured as MBSFN subframes.

Referring to FIGS. 20 and 21, a guard period 201 may be selectively included between a control region 202 and a data region 203 or in the rear of the data region 203. For example, the guard period 201 may selectively exist between the control region 202 in which an RS transmits a PDCCH to a relay UE and the data region 203 in which the RS receives data from a BS (refer to FIG. 20) or in the rear of a data region after the RS finishes receiving data from the BS (i.e., before the control region of a next subframe) (refer to FIG. 21). If the MBSFN subframe is configured as described above, there is an advantage in that radio resources which can be used to transmit data between the BS and the RS are increased, as compared with the conventional MBSFN subframe described with reference to FIG. 8.

Furthermore, a case where any guard period does not exist in a subframe may be taken into account. This corresponds to a case where a control signal that must be transmitted by an RS through a control region (e.g., a PDCCH) is not important or the amount of control signals is not much. In this case, transmission/reception switching may be performed in two OFDM symbol periods in which PDCCH transmission is performed.

A BS configures a subframe as an MBSFN subframe so that macro UEs (e.g., UEs according to 3GPP LTE release-8) do not perform reference signal measurement in the relevant subframe. Since the macro UEs do not perform reference signal measurement in the MBSFN subframe, the BS can use an additional reference signal not a common reference signal in relation to data transmitted to an RS. For example, a reference signal included in the MBSFN subframe may use smaller resource elements than a reference signal included in a DL subframe.

In general, the reference signal uses a lot of resource elements by taking a UE placed at the cell boundary into account (i.e., the density is high). However, line of sight is formed between a BS and an RS, and the RS is generally placed at a fixed position without mobility. When a channel state is good, the reference signal of a high density is mostly unnecessary between the BS and the RS. Accordingly, in the case where the BS transmits data to the RS in a subframe configured as an MBSFN subframe, the BS uses a new reference signal, but uses small resource elements (i.e., use resources elements of a low density) as compared with a reference signal used in a common DL subframe. In this case, the utilization of radio resources can be increased because more radio resources can be used to transmit data other than the reference signal. The existing UE (e.g., a 3GPP LTE release-8 UE) may not be served because it does not recognize the reference signal of a low density, but radio resources can be allocated to another RS or new UEs (e.g., 3GPP LTE release-10 UEs).

FIG. 22 shows an example in which radio resources are allocated to the conventional reference signal of a DL subframe, and FIG. 23 shows an example in which radio resources are allocated to the reference signal of an MBSFN subframe according to the present embodiment. Referring to FIGS. 22 and 23, it can be seen that a reference signal according to the present embodiment uses half the radio resources as compared with the reference signal of the conventional DL subframe (here, the number of reference symbols R may be smaller than those of the conventional reference signal). Accordingly, larger resource elements can be used to transmit data other than the reference signal.

In the case where a BS configures a subframe over which data is transmitted to an RS as an MBSFN subframe, the reference signal measurement problem which is generated when the data is transmitted to 'the RS of a form which is not seen by UEs as a separate cell' can also be solved. 'The RS of a form which is not seen by UEs as a separate cell' cannot inform relay UEs that the RS stops transmitting the reference signal in order to receive data from the BS. However, if the BS configures the subframe over which data is transmitted to the RS as the MBSFN subframe and informs the relay UEs of the configuration, the relay UEs may not perform reference signal measurement in the relevant subframe. Consequently, the BS can transmit data to 'the RS of a form which is not seen by UEs as a separate cell' without a problem for the reference signal measurement performance of the relay UEs, and 'the RS of a form which is not seen by UEs as a separate cell' can stop transmitting the reference signal and receive data from the BS.

Figure 24:
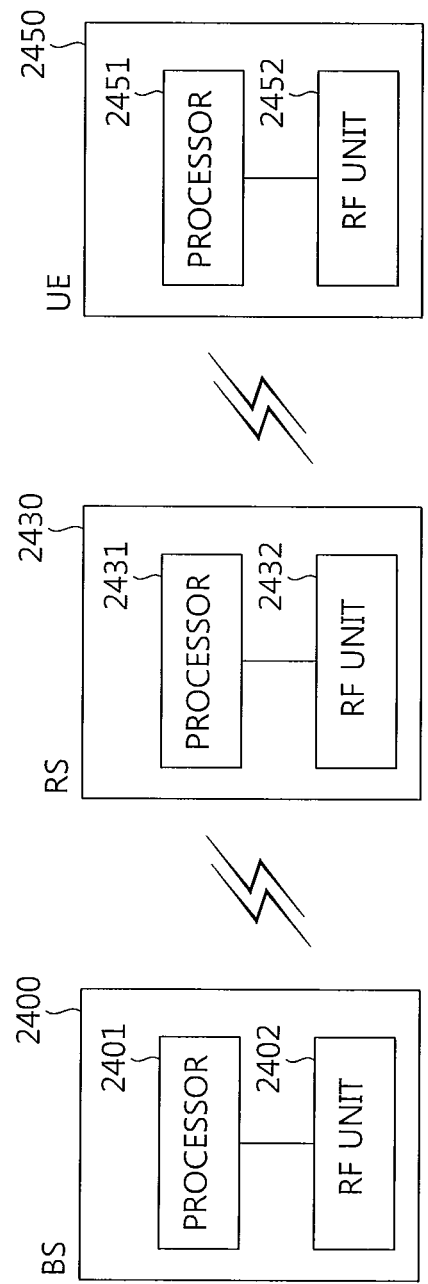
FIG. 24 is a block diagram showing a wireless communication system in which the embodiments of the present invention may be implemented.

FIG. 24 is a block diagram showing a wireless communication system in which the embodiments of the present invention may be implemented.

Referring to FIG. 24, a BS 2400, an RS 2430, and a UE 2450 communicate with each other through radio channels. The BS 2400 includes a processor 2401 and an RF unit 2402. The RF unit 2402 transmits and/or receives a radio signal. The processor 2401 is coupled to the RF unit 2402 and configured to transmit downlink data to the UE 2450. The processor 2401 performs operations for implementing the data relay methods described with reference to FIGS. 10 to 22. The RS 2430 includes a processor 2431 and an RF unit 2432. The RF unit 2432 transmits and/or receives a radio signal. The processor 2431 is coupled to the RF unit 2432 and configured to relay the downlink data, received from the BS 2400, to the UE 2450. The processor 2431 performs operations for implementing the data relay methods described with reference to FIGS. 10 to 22. The UE 2450 includes a processor 2451 and an RF unit 2452. The RF unit 2452 transmits and/or receives a radio signal. The processor 2451 is coupled to the RF unit 2452 and configured to receive the downlink data relayed from the RS 2430. Although the embodiments of the present invention have been exemplified the operation between the BS(eNB) and the RS, it can be applied to the operation between the BS(eNB) and the UE.

The present invention may be implemented using hardware, software, or a combination of them. In hardware implementations, the present invention may be implemented using ASICs (Application Specific Integrated Circuits), DSPs (Digital Signal Processors), PLDs (Programmable Logic Devices), FPGAs (Field Programmable Gate Arrays), processors, controllers, microprocessors, other electronic units, or a combination of them, which are designed to perform the above-described functions. In software implementations, the present invention may be implemented using modules performing the above-described functions. Software may be stored in a memory unit and executed by a processor. The memory unit or the processor may adopt various means well known to those skilled in the art.

Although the embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

The invention claimed is:

1. A method of relaying data in a wireless communication system, the method comprising:
   receiving data, transmitted over a first subframe from a base station, over a second subframe; and
   relaying the data to a user equipment over a third subframe which is placed after one or more subframes from the second subframe,
   wherein at least any one of the first and the second subframes is a non-detection subframe to which the user equipment does not attempt data detection, and
   wherein the second and the third subframes are included in a Time Division Duplex (TDD) radio frame comprising a plurality of subframes, and
   the TDD radio frame has one of the configurations shown in Table A below,

TABLE A

| UL-DL Con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | wherein in the Table A, 'D' means a downlink subframe, 'U' means an uplink subframe, and 'S' means a special subframe.

2. The method of claim 1, wherein the non-detection subframe is designated by configuring one of the plurality of downlink subframes, forming the TDD radio frame, as a Multicast/Broadcast Single Frequency Network (MBSN) subframe.

3. The method of claim 1, wherein the first and the second subframes are configured as in any one of configurations shown in Table B below,

TABLE B

| FIRST SUBFRAME | SECOND SUBFRAME |
|---|---|
| M | U |
| U | M |
| M | M | wherein in the Table B, 'U' means an uplink subframe, and 'M' means the non-detection subframe.

4. A relay station, comprising:
a Radio Frequency (RF) unit configured to transmit or receive a radio signal; and
a processor connected to the RF unit, wherein the processor is configured for:
  receiving data, transmitted over a first subframe from a base station, over a second subframe; and
  relaying the data to a user equipment over a third subframe which is placed after one or more subframes from the second subframe,
wherein at least any one of the first and the second subframes is a non-detection subframe to which the user equipment does not attempt data detection,
wherein the second and the third subframes are included in a Time Division Duplex (TDD) radio frame comprising a plurality of subframe, and
the TDD radio frame has one of configurations shown in Table A below,

TABLE A

| UL-DL Con-figuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | wherein in the Table A, 'D' means a downlink subframe, 'U' means an uplink subframe, and 'S' means a special subframe.

5. The relay station of claim 4, wherein the non-detection subframe is designated by configuring one of the plurality of downlink subframes, forming the TDD radio frame, as a Multicast/Broadcast Single Frequency Network (MBSN) subframe.

6. The relay station of claim 4, wherein the first and the second subframes are configured as in any one of configurations shown in Table B below,

TABLE B

| FIRST SUBFRAME | SECOND SUBFRAME |
|---|---|
| M | U |
| U | M |
| M | M | wherein in the Table B, 'U' means an uplink subframe, and 'M' means the non-detection subframe.

* * * * *